Patented Sept. 19, 1944

2,358,355

UNITED STATES PATENT OFFICE 2,358,355

TREATMENT OF POLYVINYL BUTYRAL RESINS

Gelu Stoeff Stamatoff, Rutherford, N. J., assignor to E. I. du Pont de Nemours & Company, Wilmington, Del., a corporation of Delaware No Drawing. Application February 11, 1942, Serial No. 430,438

6 Claims. (Cl. 260—32)

This invention relates to the treatment of polyvinyl butyral resins and, more particularly, to a process of converting acetone-soluble polyvinyl butyral resins to an acetone-insoluble form adapted for use in interlayer sheeting for safety-glass.

It is known that polyvinyl butyral resins are made by reacting the products of hydrolysis of polyvinyl esters with butyraldehyde. The characteristics of the resulting resins will depend interalia, upon the extent to which the initial polyvinyl ester, usually polyvinyl acetate, has been hydrolyzed and upon the extent to which the resulting hydroxyl groups have been reacted with butyraldehyde. In general, the reaction of condensation between the product of hydrolysis of the polyvinyl ester and the butyraldehyde is not complete so that the polyvinyl butyral resin will contain in its macromolecule both butyral groups and free hydroxyl groups and, frequently, also unaltered ester groups.

In applicant's copending application, Serial No. 430,437 filed of even date herewith and entitled "Preparation of polyvinyl acetal resins," is disclosed an acetone-soluble polyvinyl butyral resin of the composition:

| | Per cent |
|---|---|
| Polyvinyl ester | 0–10 |
| Polyvinyl alcohol | 15–22 |
| Polyvinyl butyral | 85–77 |

As disclosed in said application, such a polyvinyl butyral resin may be prepared by reacting polyvinyl alcohol (in reality, hydrolyzed polyvinyl acetate or other polyvinyl ester) with butyraldehyde in a predominantly water solution in the presence of an acid. A process of preparing such a resin in finely divided form free of tendency to agglomerate is set forth in detail in said application.

While an acetone-soluble polyvinyl butyral resin as set forth above is of value for certain purposes, as in adhesives, such a resin is not satisfactory for other purposes, particularly for use in interlayer sheeting for safety-glass. The objection to such a resin for use in interlayer sheeting is principally because sheeting made from the resin in conjunction with desirable proportions of plasticizer is excessively sticky and is subject to an excessive cold-flow, and also because the resin is not adapted to be compounded with plasticizers to yield sheeting which will serve satisfactorily as the interlayer in safety-glass at low and at high temperatures as well as at ordinary temperatures.

An object of the present invention is to provide a simple and economical process for converting acetone-soluble polyvinyl butyral resins of the type above described to an acetone-insoluble form, suitable for use in interlayer sheeting for safety-glass. Other objects will be apparent from the description of the invention given hereinafter.

The above objects are accomplished according to the present invention by suspending an acetone-soluble polyvinyl butyral resin of the composition:

| | Per cent |
|---|---|
| Polyvinyl ester | 0–10 |
| Polyvinyl alcohol | 15–22 |
| Polyvinyl butyral | 85–77 | in a preponderantly water vehicle in the presence of a substance of acid reaction, maintaining said vehicle at a temperature of at least about 65° C. and agitating the suspension of said resin in said vehicle until said resin becomes substantially insoluble in acetone.

It has been discovered that when an acetone-soluble polyvinyl butyral resin of the composition herein considered is suspended in water, or in a vehicle preponderantly comprised of water, but containing catalytic amounts of an acid or other substance of acid reaction and the water maintained at a temperature of at least 65° C., a change is gradually effected in the resin which becomes insoluble in acetone. The actual chemical change in the macromolecule of the resin is relatively slight. The polyvinyl alcohol content being increased perhaps by as much as 2.5% to 3.0%, by weight of the resin, as a result of the treatment.

While the untreated acetone-soluble resin is not satisfactory for use in interlayer sheeting for safety-glass, the resin treated according to the present invention, when compounded with plasticizer in conventional manner, can be made into interlayer sheeting of desirable characteristics, free from exudation or tendency to cold-flow, not excessively tacky, and of a desirable toughness which is not seriously impaired by summer or winter temperature.

The predominantly water vehicle in which the resin is suspended for treatment according to the present invention, is essentially water containing catalytic amounts of a substance of acid reaction. The presence in the vehicle of relatively small amounts of organic solvents is not excluded. There is no advantage to be gained by the presence of organic solvents but, if the resin to be treated happens to be wet with a liquid comprising, in part, an organic solvent, it may be convenient to use the resin without drying it. Since the resin will normally be in a finely divided state and it would be difficult to handle if excessive agglomeration of the particles of resin took place, it will be apparent that there is a limit to the amount of organic solvent that can be tolerated in the vehicle. In so far as the present invention is concerned, the organic solvent content of the vehicle must be less than that content which will cause troublesome agglomeration of the resin particles at the temperature used and with the agitation available for keeping the resin suspended.

It is impractical, although not theoretically impossible, to carry out the present invention without subjecting the suspension of resin in the vehicle to agitation. The purpose of the agitation is to assist in preventing excessive agglomeration of the resin particles. As the temperature of the vehicle will be at least 65° C., some softening of the resin particles will occur but with reasonable agitation and in the absence of an excessive amount of organic solvent in the vehicle any agglomeration of the resin to the point where it would be a hindrance, may be readily avoided.

The identity of the substance of acid reaction to be used in the water vehicle is not critical. Sulfuric acid is conveniently used but substantially the same result is obtained with other acids including methyl sulfuric, hydrochloric, phosphoric, benzene sulphonic, ethyl sulphonic and perchloric acids, and with salts of acid reaction, such as zinc chloride.

Within reasonable limits, the amount of substance of acid reaction contained in the vehicle is likewise not critical. Catalytic amounts will be employed and it is obvious that a high concentration of acid would be likely to affect the resin deleteriously. No object is gained by using more than 1.0% of acid by weight of the vehicle, although probably a somewhat higher concentration would be operative, and a preferred range is between 0.01% and 0.1%. Variations of the acid concentration within the range herein considered will not materially affect the results obtained nor necessitate changes in the other conditions under which the treatment is carried out.

The minimum temperature at which the vehicle is maintained during the treatment of the resin, is critical, at least from a practical point. The vehicle should be kept at a temperature of at least about 65° C. If the treatment were sufficiently prolonged, the temperature of the vehicle probably could be maintained at somewhat less than 65° C. and eventually an acetone-insoluble resin suitable for use in interlayer sheeting obtained but this has not been found to be a practical procedure. There is no critical upper limit on the temperature at which the vehicle should be maintained except that at excessively high temperatures the problem of preventing bad agglomeration of the resin particles would become very serious and, in any event, it is more practical not to use temperatures above the boiling point of water so that superatmospheric pressures and attendant complications may be avoided. The practical temperature range for the vehicle lies between 65° C. and 100° C. with a temperature of approximately 75° C.–85° C. preferred The minimum duration of the treatment of the resin is directly dependent upon the temperature of the vehicle. While the treatment can be prolonged indefinitely, it serves no purpose to continue it once the resin has been completely converted to an acetone-insoluble form. At 70° C.–75° C. the conversion of an acetone-soluble polyvinyl butyral resin of the type herein considered into an acetone-insoluble resin of the desired characteristics will require about one hour. At 60° C.–65° C. the change takes place much more slowly while at temperatures above 75° C. the change takes place more rapidly. The time advantage gained in employing higher temperatures above 85° C. is somewhat offset by the fact that greater precautions must be taken to prevent excessive agglomeration of the resin particles.

Due to the fact that the necessary duration of the treatment of the resin in the water vehicle varies with the temperature of the vehicle and may, also, vary to a lesser extent dependent upon other factors, it is not possible to state definitely a flat minimum period in minutes or hours for the treatment under all circumstances. Further, this is not necessary because the practical criterion applicable under all conditions is extremely simple, namely, the solubility of the resin in acetone. From time to time during the treatment of the resin, a portion of the resin may be removed and its solubility in acetone determined. Once the resin has reached the point where it is insoluble in acetone, the treatment may be stopped.

In carrying out the process of the present invention, the small particles of resin sometimes collect to form flakes and this is usually not objectionable. It has been observed that when such flakes, during the course of the treatment, first show insolubility in acetone and the treatment is then stopped at that point, the treated resin does not exhibit quite as favorable properties as interlayer material for safety-glass as when the treatment is continued slightly further. The reason for this is believed to be that a superficial coating of acetone-insoluble resin is formed on the individual flakes with the unexposed resin still in a state where it is not completely insoluble in acetone. For this reason, it is preferred, particularly where the resin being treated has formed into flakes, that the treatment be continued slightly beyond the point where the resin first shows insolubility in acetone. Since in practical operations some margin of safety would be allowed at any rate, the treatment would normally be carried to a point beyond the mere formation of a superficial coating of acetone-insoluble resin in any event.

The following examples illustrate specific embodiments of the present invention, all proportions given throughout the specification being by weight unless otherwise stated.

*Example I*

An acetone-soluble resin of composition (by analysis)

|  | Per cent |
| --- | --- |
| Polyvinyl acetate | 1.0 |
| Polyvinyl alcohol | 17.0 |
| Polyvinyl butyral | 82.0 | is divided into two portions.

The first (A) is not treated.

The second (B) is suspended for one hour in water, containing 0.1% of sulfuric acid, at 70° C.–75° C., and then washed and dried. Its content of polyvinyl alcohol is found to be 19.2% and it is insoluble in acetone.

Both (A) and (B) are made up into sheeting of conventional composition:

| | Parts |
|---|---|
| Resin | 70 |
| Dibutyl sebacate | 30 |

From sheetings of thickness 0.015 inch, safety glass is made by conventional methods. Safety-glass panes 12 x 12 inches are tested at 0° F. (−17.8° C.) and 120° F. (48.9° C.) by noting the height in feet required for the drop of a 0.5 pound steel ball to cause failure.

The following tabulation shows the effectiveness of the treatment at 70° C.–75° C. in converting the resin (A) into a product (B) satisfactory for safety glass.

| | Results of break tests at— | | |
|---|---|---|---|
| | 0° F. | 120° F. | |
| (A) | 15 | 12 | Sheeting is very sticky, and subject to cold-flow. |
| (B) | 24 | 17 | Sheeting is not sticky and does not cold-flow. |

*Example II*

Another acetone-soluble polyvinyl butyral resin is treated in water, containing 0.5% of sulfuric acid, at 70° C.–75° C., with the following results:

| Time of treatment, min. | Content of polyvinyl alcohol, per cent | Cold-flow [1] | Results of break tests [1] at— | | Stickiness [1] |
|---|---|---|---|---|---|
| | | | 0° F. | 120° F. | |
| 0 | 15.7 | | | | |
| 30 | 17.0 | No | 18 | 13 | Slight. |
| 60 | 18.15 | No | 27 | 15 | O. K. |

[1] Sheeting of composition:

| | Parts |
|---|---|
| Resin | 70 |
| Dibutyl sebacate | 30 |

After the 60-minute treatment, the resin is insoluble in acetone but it had not been converted into an acetone-insoluble product after the 30-minute treatment.

*Example III*

An acetone-soluble polyvinyl butyral resin is made in the following manner:

The ingredients used are:

| | Parts |
|---|---|
| Polyvinyl alcohol | 100 |
| Methanol residue | 87.5 |
| Acid residue (as sulfuric) | 0.38 |
| Sulfuric acid | 1.88 |
| Water | 707 |
| | 896.8 |
| Butyraldehyde | 74.5 |

The aldehyde and the preponderantly aqueous solution of polyvinyl alcohol are brought together in proportionate increments by being introduced simultaneously into a mixing vessel at uniform rates proportional to the respective totals and so calculated that the time required for the mixing is nineteen minutes.

The mixing vessel is provided with an agitator which is kept in rapid motion during the commingling of the liquids. The resulting mixture passes continuously from the mixing vessel into a condensation kettle.

The complete mixture is vigorously agitated in the condensation kettle, maintained at 50° C., for one hour longer, to bring the reaction to the desired end-point. The reaction batch is then cooled, and the polyvinyl butyral resin, which retains the previously developed finely divided form, is separated from the liquid, and purified in known manner.

By analysis, the resulting resin contains:

| | Per cent |
|---|---|
| Polyvinyl acetate | 1.0 |
| Polyvinyl alcohol | 21.1 |
| Polyvinyl butyral | 77.9 |

It is soluble in acetone.

This resin is now heated for one hour in suspension in water containing 0.1% of sulfuric acid, at 75° C., and then washed. The resin so treated is insoluble in acetone and meets the stated requirements for use in safety-glass interlayer.

*Example IV*

Another portion of the acetone-soluble resin of Example III is heated for one-half hour in water containing 0.1% of sulfuric acid, at 85° C.–90° C., and then washed. The resulting resin is insoluble in acetone and similar to the product of Example III.

In the above examples the suspension of resin in the water vehicle was kept agitated throughout the treatment.

It will be understood that the above examples are merely illustrative and that the invention broadly comprises suspending the acetone-soluble polyvinyl butyral resin in a preponderantly water vehicle in the presence of catalytic amounts of a substance of acid reaction, maintaining the vehicle at a temperature of at least about 65° C. and agitating the suspension of the resin in the vehicle until the resin becomes substantially insoluble in acetone.

The present invention provides an economical method for the production of polyvinyl butyral of characteristics desirable for use in the compounding of safety-glass interlayer. The process is carried out in a preponderantly aqueous medium and organic solvent is present only in small quantities and incidentally, if at all. That is to say, organic solvent is not deliberately added, but may be present in the polyvinyl alcohol as a by-product of its preparation and allowed to enter the reaction batch of the present invention simply to save the expense of removing it from the polyvinyl alcohol. Since the process of the present invention is carried out in the absence of more than this incidental amount of organic solvent, it saves the ordinarily considerable cost of organic solvent used as a vehicle for the reaction of condensation. Furthermore, the reaction is economical also through the fact that a comparatively small excess of aldehyde over the stoichiometric proportion is needed to cause the reaction to go to the desired end point. The resin is produced by the present invention in a particle size which promotes its separation, stabilization and purification.

As many apparently widely different embodiments of this invention may be made without departing from the spirit and scope thereof, it is to be understood that the invention is not limited to the specific embodiments thereof except as defined in the appended claims.

I claim:

1. Process of treating polyvinyl butyral resins which comprises suspending an acetone-soluble polyvinyl butyral resin of the composition, by weight:

| | Percent |
|---|---|
| Polyvinyl ester | Up to 10 |
| Polyvinyl alcohol | 15–22 |
| Polyvinyl butyral | 85–77 | in a preponderantly water vehicle in the presence of catalytic amounts of a substance of acid reaction, maintaining said vehicle at a temperature of at least about 65° C. and agitating the suspension of said resin in said vehicle until said resin becomes substantially insoluble in acetone.

2. Process of treating polyvinyl butyral resins which comprise suspending a finely divided, acetone-soluble polyvinyl butyral resin of the composition, by weight:

| | Percent |
|---|---|
| Polyvinyl ester | Up to 10 |
| Polyvinyl alcohol | 15–22 |
| Polyvinyl butyral | 85–77 | in a preponderantly water vehicle in the presence of catalytic amounts of a substance of acid reaction, maintaining said vehicle at a temperature of 65° C.–100° C. and agitating the suspension of said resin in said vehicle until said resin becomes substantially insoluble in acetone.

3. Process of treating polyvinyl butyral resins which comprises suspending a finely divided, acetone-soluble polyvinyl butyral resin of the composition, by weight:

| | Percent |
|---|---|
| Polyvinyl ester | Up to 10 |
| Polyvinyl alcohol | 15–22 |
| Polyvinyl butyral | 85–77 | in water in the presence of catalytic amounts of an acid, maintaining said water at a temperature of 65° C.–100° C. and agitating the suspension of said resin in said water until said resin becomes substantially insoluble in acetone.

4. Process of treating polyvinyl butyral resins which comprises suspending a finely divided, acetone-soluble polyvinyl butyral resin of the composition, by weight:

| | Percent |
|---|---|
| Polyvinyl acetate | Up to 10 |
| Polyvinyl alcohol | 15–22 |
| Polyvinyl butyral | 85–77 | in a preponderantly water vehicle in the presence of catalytic amounts of sulfuric acid not exceeding 1.0% by weight of said vehicle, maintaining said vehicle at a temperature of 65° C.–100° C. and agitating the suspension of said resin in said vehicle until said resin becomes substantially insoluble in acetone.

5. Process of treating polyvinyl butyral resins which comprises suspending a finely divided, acetone-soluble polyvinyl butyral resin of the composition, by weight:

| | Percent |
|---|---|
| Polyvinyl acetate | Up to 10 |
| Polyvinyl alcohol | 15–22 |
| Polyvinyl butyral | 85–77 | in a preponderantly water vehicle in the presence of 0.01%–0.1% of sulfuric acid by weight of said vehicle, maintaining said vehicle at a temperature of approximately 75° C.–85° C. and agitating the suspension of said resin in said vehicle until said resin becomes substantially insoluble in acetone.

6. Process of treating polyvinyl butyral resins which comprises suspending a finely divided, acetone-soluble polyvinyl butyral resin of the composition, by weight:

| | Percent |
|---|---|
| Polyvinyl acetate | Up to 10 |
| Polyvinyl alcohol | 15–22 |
| Polyvinyl butyral | 85–77 | in water in the presence of 0.01%–0.1% of sulfuric acid by weight of said water, maintaining said water at a temperature of approximately 75° C.–85° C. and agitating the suspension of said resin in said water until said resin becomes substantially insoluble in acetone.

GELU STOEFF STAMATOFF.